United States Patent [19]

Wiseman

[11] 4,203,820

[45] May 20, 1980

[54] ELECTROLYTIC CELL BRINE FLOW METER

[75] Inventor: Russell M. Wiseman, Mentor, Ohio

[73] Assignee: Diamond Shamrock Corporation, Dallas, Tex.

[21] Appl. No.: 948,413

[22] Filed: Oct. 4, 1978

[51] Int. Cl.² .................. C25B 9/00; C25B 15/08; G01F 1/22

[52] U.S. Cl. .................. 204/263; 204/279; 73/209

[58] Field of Search .................. 204/275, 279, 263; 73/207, 209

[56] References Cited

U.S. PATENT DOCUMENTS

| | | | |
|---|---|---|---|
| 1,191,356 | 7/1916 | Smith | 204/275 X |
| 2,669,122 | 2/1954 | Silsby, Jr. | 204/275 X |
| 3,633,421 | 1/1972 | Phillips | 73/209 |
| 3,675,481 | 7/1972 | Phillips | 73/209 |
| 3,768,309 | 10/1973 | Hart | 73/209 |
| 3,842,671 | 10/1974 | Frizelle | 73/209 |

Primary Examiner—John H. Mack
Assistant Examiner—D. R. Valentine
Attorney, Agent, or Firm—Bruce M. Winchell

[57] ABSTRACT

Disclosed is a new form of brine flow meter necessary in metering brine to an electrolytic cell for the production of chlorine and caustic (sodium hydroxide). The flow meter is made advantageously of a plastic material resistant to the various pH ranges necessary for brine being fed to such an electrolytic cell with the additional advantage of clarity for visual observation of the flow rate and resistance qualities.

5 Claims, 3 Drawing Figures

ELECTROLYTIC CELL BRINE FLOW METER

BACKGROUND OF THE INVENTION

The present invention relates generally to the use of a brine flow meter for metering brine (sodium chloride solution) to an electrolytic cell for the production of chlorine and caustic. More particularly, the present disclosure relates to an improved brine flow meter made of a plastic material advantageously resistant chemically to a wide range of pH necessary for brines of various pH levels being utilized in today's commercial chlorine and caustic cells. This employs the use of a polysulfone material, which retains the clarity necessary for visual perception of the flow of brine into the electrolytic cell, while providing substantially increased resistance to chipping and breaking due to chemical attack from brines having a high pH. Furthermore, this flow meter utilizes an additional tube around the outside of the polysulfone material to prevent ultraviolet attack of the polysulfone used for the brine meter itself.

Chlorine and caustic are essential in large volume basic commodity chemicals required by all industrialized societies. They are produced almost entirely electrolytically from aqueous solutions of alkali metal chlorides, with the major portion of such production coming from diaphragm-type electrolytic cells. In the diaphragm cell process, brine is fed continuously to the anode compartment and flows through the diaphragm usually made of asbestos, backed by a cathode. To minimize back migration of hydroxide ions, the flow rate is always maintained in excess of the conversion rate so that the resulting catholyte solution has unused alkali metal chloride present. However, to maintain the amount of unused alkali metal chloride present to an absolute minimum, it is essential to very carefully meter in the brine to the electrolytic cell by utilizing a brine flow meter or some device for such careful control. It is very important that the operator be permitted to visually perceive the amount of brine flowing into the electrolytic cell and to control such flow so as to run a constant check on the amount of unused alkali metal chloride present in the catholyte. The hydrogen ions are discharged from the solution at the cathode in the form of hydrogen gas. The catholyte solution containing caustic soda, unreacted sodium chloride and other impurities then must be concentrated and purified to obtain marketable alkali metal hydroxide commodity and alkali metal chloride, which can be reused in the chlorine and caustic electrolytic cell for further production of chlorine and caustic. Recent advances in hydraulically impermeable cation-exchange membranes have allowed the electrolytic cell to produce a much higher quality caustic product by significantly reducing the impurities present in the product and also increasing the concentration of that product. These cells also require the careful control of brine flow so as to provide the best operating conditions for the electrolytic cells.

Much research and development attention has been directed to various components of the electrolytic cell, such as the anodes, anode coatings therefor and the cation-exchange hydraulically impermeable membranes. One problem that has received very little attention, though, is the brine flow meter, which is so necessary to the successful operation of an electrolytic cell. It has been found that glass flow meters for brine metering have a fatal characteristic in that they are not resistant to solutions of high pH. Thus, the use of a glass flow meter for brine metering has caused problems in those instances where the brine is maintained at a high pH to obtain economy of use of HCl used to lower the brine pH. In fact, in most instances, the glass is very often chipped by the float utilized in such flow meters, partly because of the lack of uniformity caused by use of the glass tubes, and also because of the lack of chemical resistivity to high pH levels. This very often causes chipping and, ultimately, causes a breaking of the tube because the glass is brittle and prone to mechanical damage. Such breakage has been very detrimental in interrupting the operation of an electrolytic cell and, perhaps, even a bank of electrolytic cells, in addition to causing major spill problems when the flow of brine is interrupted to the electrolytic cell.

Thus, it would be very beneficial and advantageous to the operation of an electrolytic cell to provide a brine flow meter capable of resisting brine solutions of a high pH and additionally maintaining a higher degree of uniformity in the internal wall structure of said brine meters so as to advance this ideal characteristic of brine flow meters.

SUMMARY OF THE INVENTION

It is, therefore, an object of the present invention to provide a brine flow meter capable of withstanding chemical attack by any brine flow therethrough.

Another object of the present invention is to provide an improved brine flow meter having superior quality of uniformity of interior wall construction so as to avoid the chipping and breaking attendant to glass brine flow meters.

It is a still further object of the present invention to provide a brine flow meter capable of withstanding chemical attack over a wide range of pH.

These and other objects of the present invention, together with the advantages thereof over existing and prior art forms which will become apparent to those skilled in the art from the detailed disclosure of the present invention set forth hereinbelow, are accomplished by the improvements herein shown, described and claimed.

It has been found that a brine flow meter for an electrolytic cell for the production of chlorine and caustic can be made of an injection molded polysulfone material having a high degree of uniformity of internal wall structure; and a surrounding cylinder of transparent ultraviolet light resistant and mechanically rigid material for protection of the float guide tube.

DESCRIPTION OF THE PREFERRED EMBODIMENT

Figures 2, 3:
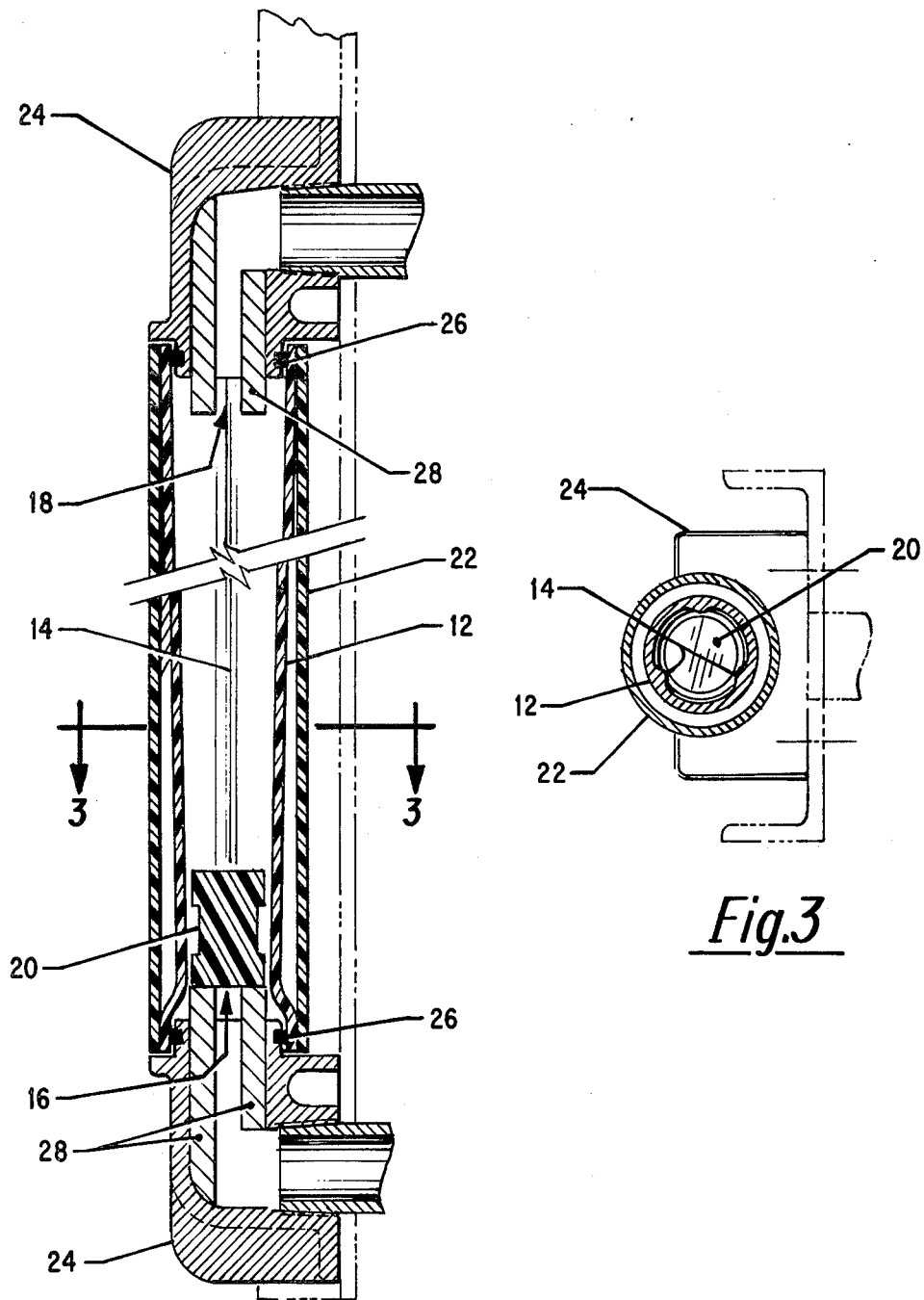
FIG. 2 is a side section view taken substantially along line 2—2 of FIG. 1.
FIG. 3 is a top section view taken substantially along line 3—3 of FIG. 2.

An electrolytic cell brine flow meter according to the concepts of the present invention is generally referred to by numeral 10 in the figures of the drawings. Such a brine flow meter is contemplated to be a variable area type flow meter, which simply is a device for measuring the flow through the instrument into the electrolytic cell of a brine stream. It consists of a float tube 12, which is generally a tapered tube mounted vertically in the fluid stream with its smaller diameter conjugate plane being at the bottom or at the float tube ingress 16, and the larger diameter conjugate plane being at the top of the float tube 12 or at the float tube egress 18. Such a tube can have various cross-sectional areas; but, as seen in FIG. 3, the fluted design is preferred, which presents float tube guides 14 for the float 20 to ride against, up and down, the tube for measuring the flow through the tube. Within the float tube 12, the float 20 is free to move up and down the float tube 12 in accordance with the fluid that is flowing through the tube from the bottom float tube ingress 16 to the top float tube egress 18. As the fluid flows through the tube, the float rises within the area between it and the tube wall until the diameter is just large enough to pass the amount of fluid flowing through the float tube 12. The height of such a float tube 12, therefore, is a measure of the flow rate through the float tube 12. In use, such an electrolytic cell brine flow meter 10 would be connected at the bottom or float tube ingress 16 to the brine supply for the electrolytic cell bank, and the top or float tube egress 18 is connected to the electrolytic cells being fed with brine.

The basis for operation of the float tube 12 in this given instance is that the float tube 12 has integral flutes or float tube guides 14 as shown in the drawings formed on the inside of the tube at the time of manufacture. Thus, although the flute walls themselves are tapered, the diameter of the enclosed flutes or float tube guides 14 is nearly constant over the length of the tube so as to provide a smooth guide path for the float 20 up and down the entire length of the float tube 12. Of course, as the flow rate changes, the float 20 moves freely in the vertical direction, up and down the float tube 12, but is restrained by the float tube guides 14 from all but very minor amounts of horizontal motion. Consequently, the readings of the float 20 on a vertical scale placed upon the float tube 12 provides an extremely accurate and repeatable measurement of the flow through the float tube 12. The float tube 12 will be connected into either end to appropriate fittings by the use of an O-ring seal 26 at each end thereof to assure proper sealing engagement of the float tube to each end fitting block 24 therewith for connecting the electrolytic cell brine flow meter 10 to the brine supply for the electrolytic cell. Such O-ring seals 26 should preferably be made of a rubber or elastomeric composition such as Neoprene having a 70 durometer hardness. In assembly of the flow meter 10, the O-ring seals 26 should be lubricated using a substance such as a high velocity silicone oil.

Figure 1:
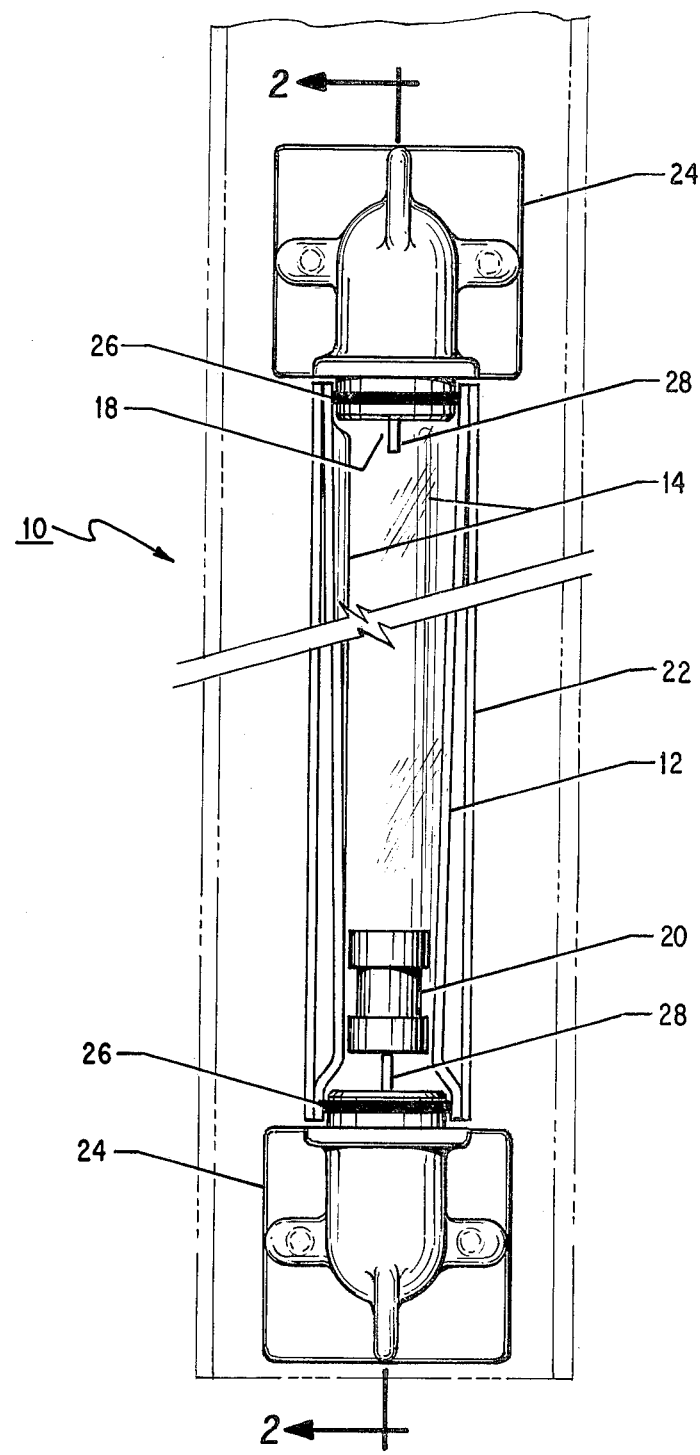
FIG. 1 is a side elevation view of a brine flow meter according to the concepts of the present invention which can be used for the metering of a brine to an electrolytic cell for the production of chlorine and caustic.

At the float tube ingress 16 and float tube egress 18 are float stops 28 to retain the float 20 within the float tube guides 14 and to maintain the alignment of the float 20. As seen in FIGS. 1 and 2, the float stops 28 protrude slightly into the float tube 12 from each end fitting block 24.

It is very important that the float tube 12 be manufactured of a polysulfone material and injection molded to assure a high degree of quality and close tolerances of the float tube guides 14. The reason for this is that brine flow meters of the prior art utilizing glass have lacked the uniformity of the float tube guides 14 necessary to withstand the caustic brine flow therethrough. Furthermore, glass is not resistant to caustic (sodium hydroxide) and, therefore, chipping and eventual breakage occurs with glass. It has been found that the float tube 12 can be advantageously made of polysulfone material, which is quite resistant to potassium hydroxide or sodium hydroxide up to strengths of 50 percent and up to temperatures of 185°. Thus, polysulfone appears to be the only transparent material adequate for handling a hot caustic brine solution for feeding to an electrolytic cell. Furthermore, such polysulfone material can be purchased from Union Carbide Corporation under the trademark UDEL. UDEL polysulfone is a high performance thermoplastic known for its high temperature resistant up to 300° F. UL listing for continuous use, hydrolytic stability and excellent close tolerance moldability. The close tolerance moldability for injection molding is very important in the present instance in that only with close tolerances of the float tube guides 14 can the float tube 12 be successfully utilized in this particular application. Therefore, the particular qualities of UDEL polysulfone are particularly suited for this particular application of high temperature, high pH brine flow for feeding electrolytic cells. Furthermore, UDEL polysulfone is particularly useful from the standpoint that production costs for such a flow meter can be reduced significantly over those for glass flow meters for the same general purpose.

Polysulfone, though, does have a weakness which must be compensated for in its use. This weakness is ultraviolet radiation. It has a tendency to cause polysulfone to crack and otherwise deteriorate. Thus, it has been found that an electrolytic cell brine flow meter 10 having a float tube 12 made of polysulfone must utilize a float tube protector 22 made of acrylic or other material which will not transmit UV radiation. Thus, as seen in the drawings, the float tube protector 22 is a cylinder surrounding the outside edge of the float tube 12 made of polysulfone to protect it from ultraviolet radiation, which is harmful to polysulfone material. Furthermore, the float tube protector 22 still allows ample visability of the float 20 as it rides vertically in the float tube guides 14 of float tube 12 for a measurement of the brine flow therethrough.

While many forms of float 20 could be utilized in such a flow meter 10, it has been found that the cylinder having equal larger diameter conjugate plane cylinders at either end thereof works well for the metering of brine into electrolytic cells.

Thus, it should be apparent from the foregoing description of the preferred embodiment that the device for the metering of a brine to an electrolytic cell herein shown and described accomplishes the objects of the invention and solves the problems attendant to metering brines to electrolytic cells, especially those brines having high temperature and high pH.

What is claimed is:

1. An electrolytic brine cell including a flow meter for metering the flow of brine into the electrolytic cell for the production of chlorine and caustic, said flow meter comprising: a float tube made of UDEL polysulfone injection molded; said float tube being of a fluted design so as to provide uniform float tube guides over an ever increasing cross-sectional area; the smaller diameter conjugate plane of said float tube being the float tube ingress and connected to the supply of brine for use in a chlor-alkali electrolytic cell; the larger diameter conjugate plane of said float tube being at the top of the float tube and being the float tube egress as connected to the piping for transfer into a chlor-alkali electrolytic cell for the production of chlorine and caustic; a float riding in the interior of said float tube along said float tube guides in close tolerance thereto so as to restrain horizontal movement thereof during the passage of flow by said float in said float tube; said float tube having a float tube protector completely surrounding said float tube and being of a visually transparent material resistant to the transmittance of UV radiation; and said float tube, along with said float tube protector being connected to associated piping for transmitting the supply of brine having a high pH therethrough by means of an O-ring seal at each end of said float tube.

2. An electrolytic cell brine flow meter according to claim 1 wherein the brine has a high pH.

3. An electrolytic cell brine flow meter according to claim 2 wherein said float is a cylinder having equal larger diameter conjugate plane cylinders at either end thereof.

4. An electrolytic cell brine flow meter according to claim 3 wherein said O-ring seals are made of Neoprene having a 70 durometer hardness.

5. An electrolytic cell brine flow meter according to claim 4 wherein said O-ring seals are lubricated with a high velocity silicone oil prior to assembly.

* * * * *